W. S. EARHART.
ADJUSTABLE FIXTURE STUD FOR ELECTRIC CONDUIT OUTLET BOXES.
APPLICATION FILED OCT. 10, 1911.
1,040,175.  Patented Oct. 1, 1912.
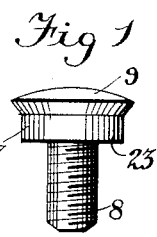
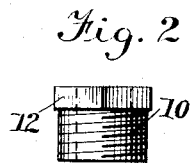
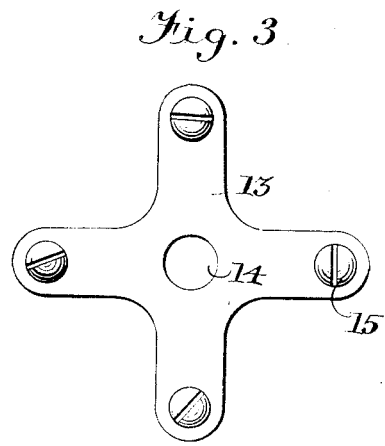
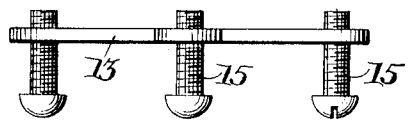
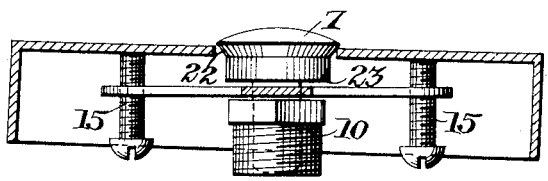
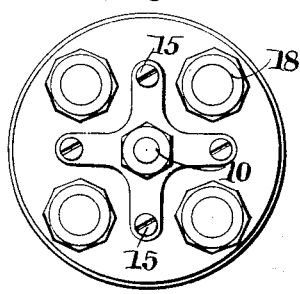
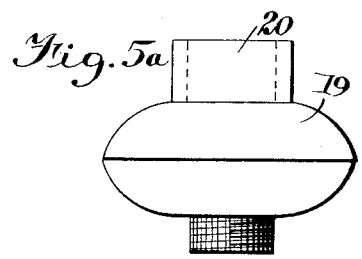
Witnesses
Alfred G. Seiler
Inventor
William S. Earhart
By Victor J. Evans
Attorney

UNITED STATES PATENT OFFICE.

WILLIAM S. EARHART, OF DENVER, COLORADO.

ADJUSTABLE FIXTURE-STUD FOR ELECTRIC-CONDUIT OUTLET-BOXES.

1,040,175.  Specification of Letters Patent.   Patented Oct. 1, 1912.

Application filed October 10, 1911. Serial No. 653,879.

*To all whom it may concern:*

Be it known that I, WILLIAM S. EARHART, a citizen of the United States, residing at Denver, in the county of Denver and State of Colorado, have invented new and useful Improvements in Adjustable Fixture-Studs for Electric-Conduit Outlet-Boxes, of which the following is a specification.

This invention relates to adjustable fixture studs adapted for use in connection with conduit outlet boxes where same is out of alinement and also where the outlet box is level, to correct an inalinement in the threading of insulating joint and fixture stem which would cause fixture to hang out of plumb, even though attached to a level outlet box; the above adjustable stud will remedy any of these imperfections and cause the fixture to hang perfectly plumb and solid, which makes a job pleasing to the eye and satisfactory.

Another object of the invention is the provision of novel means for adjusting or alining fixtures without requiring the stud to be adjusted by washers or strips of metal slipped under the lugs of the high side of the ordinary fixture stud. This usually requires a trip or two up and down the step ladder to see when the fixture is plumb, and even then it is only temporarily accomplished for with the ordinary handling of the fixture in turning on and off the lights the fixture works loose, the washers drop out and an imperfect job is the inevitable outcome. With the above adjustable stud the entire operation of hanging, alining the fixture and soldering the outlet wires can be done with one trip on the ladder.

Another object of the adjustable fixture stud is the novel means of hanging fixtures so they will remain solid with the ceiling support and will not work loose.

With these objects in view and others, which will appear as the description proceeds, the invention comprises the various novel features of construction and arrangement of parts which will be more fully described hereinafter and set forth with particularity in the claims appended hereto.

In the accompanying drawing, which illustrates one embodiment of the invention: Figure 1 is a side elevation of the fixture stud or bolt. Fig. 1ª is a bottom plan view thereof. Fig. 2 is a side elevation of the reducing bushing. Fig. 2ª is a bottom plan view thereof. Fig. 3 is a bottom plan view of the adjustable spider. Fig. 4 is a side elevation thereof. Fig. 5 is a sectional view of an outlet box or pan with the parts assembled therein. Fig. 5ª is a side elevation of an ordinary insulating joint. Fig. 6 is a bottom plan view of an ordinary outlet box with the conduit pipes entering same and the adjustable fixture stud in position.

Similar reference characters are employed to designate corresponding parts throughout the views.

Referring to the drawings, 7 designates the body of the adjustable stud or bolt, which is formed of metal, the stud being externally threaded on its reduced end 8 and made conical at the opposite end 9, so as to permit of the stud being swung at any angle desired with reference to base of outlet box. The reducing bushing 10 is hexagonally formed at the top 12 so as to permit of the use of a wrench or pliers if necessary in tightening or removing same from insulating joint when the fixture for any cause is taken down. The reducing bushing is externally threaded to engage a three-eighths inch standard insulating joint, and internally threaded so as to engage an ordinary one-eighth inch pipe thread on the end 8 of the stud 7.

13 in Figs. 3 and 4 denotes the adjustable spider which has a central passage 14 and adjusting screws 15 at the four extremities.

Figs. 5 and 6 show the adjustable fixture stud attached to the ordinary electric conduit outlet box. The stud 7 passes through the central passage 22 of the outlet box, and the portion 8 through the central passage 14 of the spider and engages the internally threaded reducing bushing 10 causing the spider to be held firmly in place against the shoulder 23 when the reducing bushing is screwed up sufficiently. The external thread of the reducing bushing is adapted to receive the standard three-eighths inch insulating joint at 19 and 20. The fixture can be alined after being attached to the reducing bushing 10 by means of the rounded surface of the stud at 9 which permits of the stud being swung at any angle.

18 in Fig. 6 is the bushing on the pipes entering the outlet box, which are not shown in Fig. 5. The spider and bushing can be left off until all the lock nuts and bushings are put on the ends of the conduits entering the outlet box, then it will not interfere with any of the operations of fitting the conduits to outlet box.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus fully described the invention as well as the article which is on the market at the present time, what I claim as new is:—

1. In combination, an outlet box having an apertured and threaded stud having a conical head seated in the aperture, a shoulder formed on the stud, a cruciformed plate mounted on the stud, a reducing coupling adapted to hold the plate against said shoulder, and screw threaded into each end of the plate and adapted to engage the box and hold the stud in adjusted angular position with relation to the box.

2. An adjustable fixture stud consisting of a hanger plate, a member having a universal connection with said plate, a second plate having a plurality of angularly disposed arms secured to said member with the arms radiating therefrom and screws threaded through the ends of said arms and engaging the first plate to adjustably hold said first member against movement on said plate.

3. An adjustable fixture stud comprising a hanger plate having a central opening, a headed member disposed in the opening of said hanger plate and having universal connection therewith, a cruciform plate disposed against said headed member, a second member bearing against said cruciform plate and threaded on said headed member and screws threaded through the ends of the arms of said cruciform plate to adjust the relation of said headed member on said hanger plate.

4. In combination, a hanger plate, a member having a conical head extending through the hanger plate and having universal connection with the hanger plate by said conical head and means carried by said member for holding the same in various adjustable positions with respect to the hanger plate.

5. In combination, a hanger plate having an opening therein, a member having a conical head universally adjustable in said opening and supporting said member on said hanger plate, a device mounted on said member, and means carried by said device and adapted to hold said member in various adjusted positions on said hanger plate.

In testimony whereof I affix my signature in presence of two witnesses.

WILLIAM S. EARHART.

Witnesses:
CHARLES R. BOSWORTH,
IRVING R. COWLES.